United States Patent

Hanada et al.

[11] Patent Number: 5,672,006
[45] Date of Patent: Sep. 30, 1997

[54] INTERNAL RUBBER MIXER

[75] Inventors: Shuichi Hanada; Yajuro Seike; Toshikazu Shojima; Takashi Moribe, all of Nagasaki; Haruhiro Takano; Ichiro Nishimura, both of Hiratsuka, all of Japan

[73] Assignees: Mitsubishi Jukogyo Kabushiki Kaisa; The Yokohama Rubber Co., Ltd, both of Tokyo, Japan

[21] Appl. No.: 609,926

[22] Filed: Feb. 29, 1996

[30] Foreign Application Priority Data

Mar. 1, 1995 [JP] Japan .................. 7-042011

[51] Int. Cl.$^6$ .................................. B29B 7/18
[52] U.S. Cl. .................................. 366/84; 366/300
[58] Field of Search .................. 366/83, 84, 85, 366/96, 97, 90, 297, 300, 301, 318, 322; 425/208, 209

[56] References Cited

U.S. PATENT DOCUMENTS

| | | | |
|---|---|---|---|
| 4,058,297 | 11/1977 | Seufert | 366/83 |
| 4,234,259 | 11/1980 | Wiedmann | 366/85 |
| 4,300,838 | 11/1981 | Sato | 366/84 |
| 4,744,668 | 5/1988 | Nortey | 366/84 |

FOREIGN PATENT DOCUMENTS

| | | |
|---|---|---|
| 0 264 224 | 4/1988 | European Pat. Off. . |
| 0 340 888 | 11/1989 | European Pat. Off. . |
| 0 346 680 | 12/1989 | European Pat. Off. . |
| 0 552 514 | 7/1993 | European Pat. Off. . |
| 63-1093 | 1/1988 | Japan . |
| 2 028 153 | 3/1980 | United Kingdom . |

*Primary Examiner*—Charles E. Cooley
*Attorney, Agent, or Firm*—Wenderoth, Lind & Ponack

[57] ABSTRACT

A shearing action of rubber by a rotor wing has a relation to a wing perpendicular component $P_z$ of P (see FIG. 4), and the larger the value of $P_z$, the larger the shearing action. An agitating action of rubber has a relation to a wing parallel component $P_x$ of P (see FIG. 4), and the larger the value of $P_x$, the larger the agitating action. In order to maintain the shearing action and the agitating action of rubber at a high level, in an internal rubber mixer a helix angle of a long wing 2 is set in a range of not less than 30° and less than 50°. Further, an axial directional length $L_s$ of a short wing 3 is made larger than that ($\delta$) of a cut-off portion of the long wing 2. A rubber flow f-1 is thereby prevented from passing straight through a rotor space portion. In this way, the internal rubber mixer is excellent in the shearing action of rubber, whereby enhances productivity and micro-dispersibility of a compounding agent, and is excellent in the agitating action of rubber, whereby it enhances macro-dispersibility of the compounding agent and low temperature mixing of rubber.

10 Claims, 9 Drawing Sheets

INTERNAL RUBBER MIXER

BACKGROUND OF THE INVENTION

1. Field of the Invention

The present invention relates to an internal rubber mixer.

2. Description of the Prior Art

Figure 13:
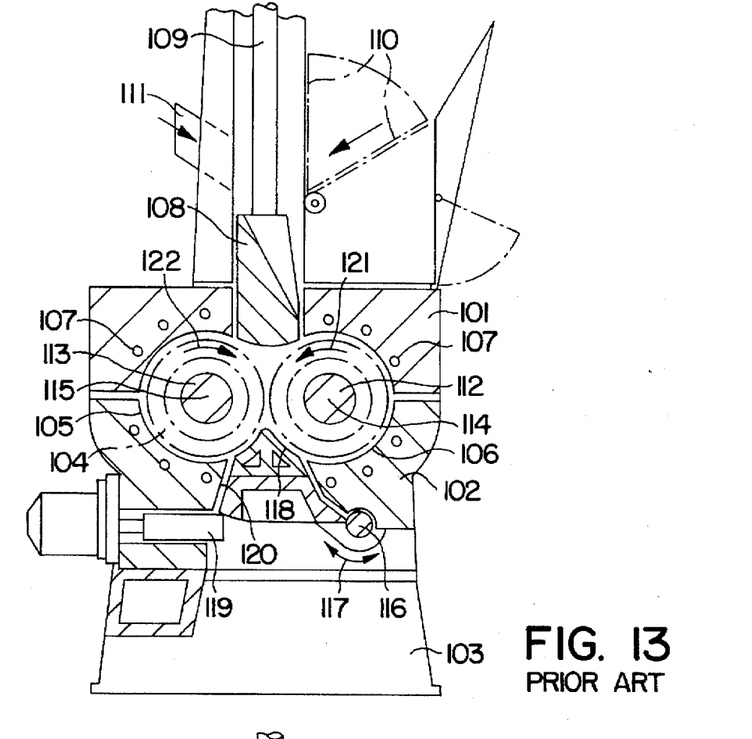
FIG. 13 is a transverse sectional view showing an internal rubber mixer in the prior art.
Figure 14:
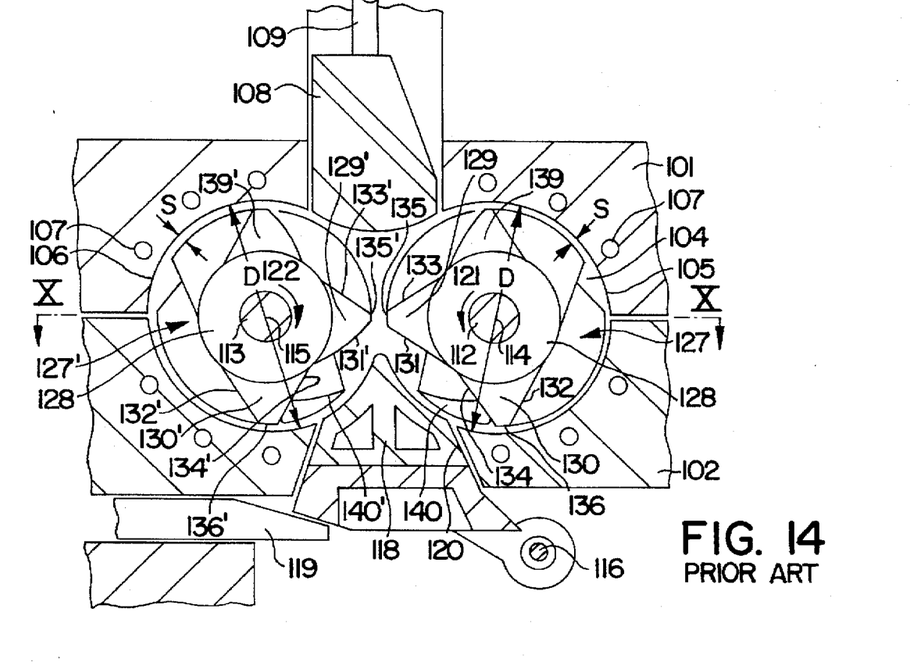
FIG. 14 is an enlarged transverse sectional view showing a part of the internal rubber mixer in the prior art.

An internal rubber mixer in the prior art is described with reference to FIGS. 13 to 16. In FIGS. 13 and 14, numeral 101 designates a container upper part, numeral 102 designates a container lower part, numeral 104 designates a mixing chamber formed between the container upper part 101 and the container lower part 102, numerals 105, 106 designate wall faces of the mixing chamber 104, numeral 107 designates cooling passages provided at the container upper part 101 and the container lower part 102, numeral 108 designates a piston to force a mixing material into the mixing chamber 104 and numeral 109 designates a piston rod.

Numeral 110 designates a hinged supply portion cover, numeral 111 designates a supply port of a compounding agent (a vulcanizing agent for example), numerals 112, 113 designate rotating shafts disposed in parallel with each other within the mixing chamber 104, numerals 114, 115 designate axes of the rotating shafts 112, 113, numeral 116 designates a shaft of a mixing chamber lower part, numeral 118 designates a hinged saddle portion supported by the shaft 116 so as to be swingable in the directions of arrows 117, numeral 119 designates a locking device of the hinged saddle portion 118, numeral 120 designates an opening portion of the mixing chamber 104 to be opened or closed by the hinged saddle portion 118 and numerals 121, 122 designate rotating directions of the rotating shafts 112, 113.

Figure 15:
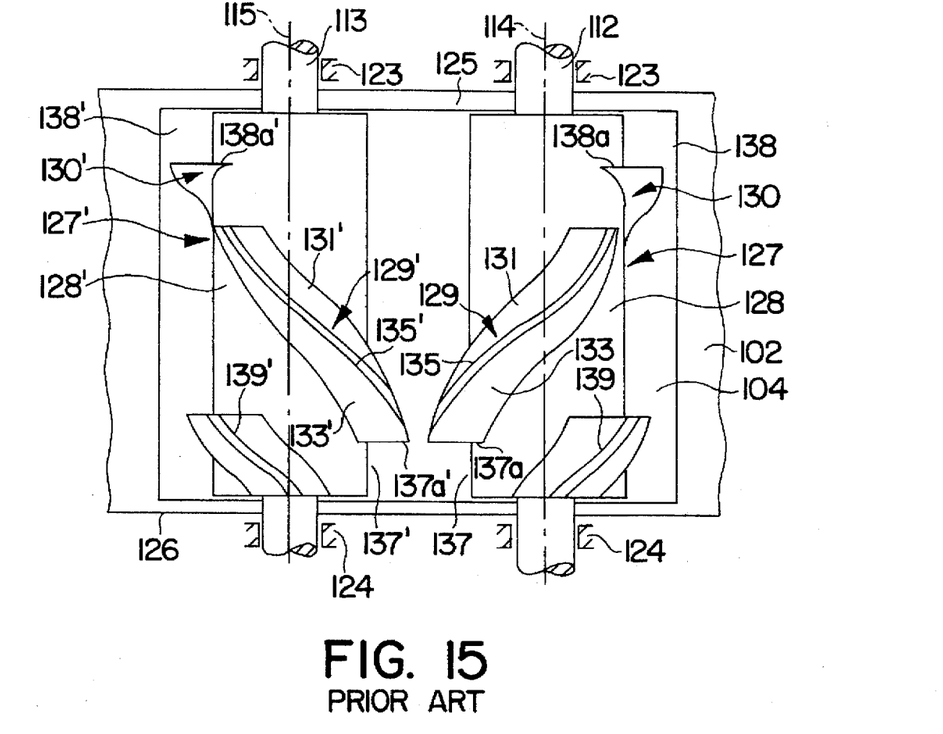
FIG. 15 is a horizontal sectional view taken along line X—X in the direction in arrows of FIG. 14.

In FIG. 15, numerals 123, 124 designate bearings of the rotating shafts 112, 113, numerals 125, 126 designate end face walls of the mixing chamber 104 supporting the bearings 123, 124 and numerals 127, 127' designate mixing and kneading wing units connected to the rotating shafts 112, 113. These wing units 127, 127' have cylindrical wing unit base portions 128, 128' provided along the axial direction of the mixing chamber 104 and fitted with transferring and mixing wings 129, 130 and 129', 130', respectively. These wings 129, 130 and 129', 130' are disposed in face to the directions as shown in FIG. 14 and side faces 131, 132 and 131', 132' of wings to bump a mixing material are formed convexly and back side faces thereof 133, 134 and 133', 134' are formed slightly convexly.

The wings 129, 130 are disposed on the cylindrical wing unit 128, the wings 129', 130' are disposed on the cylindrical wing unit 128', the wings 129, 129' form a pair, the wings 130, 130' form a pair, and when the wing units 127, 127' rotate, tip portions 135, 135' of the wings 129, 129' and tip portions 136, 136' of the wings 130, 130', respectively, approach and pass by each other.

Figure 16:
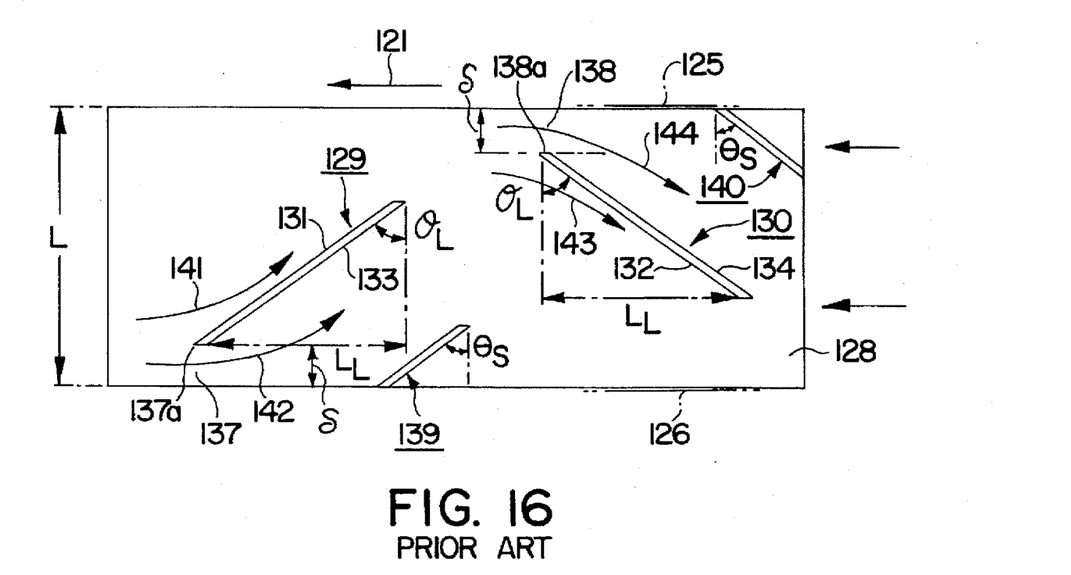
FIG. 16 is a development of a cylindrical wing unit base portion of the internal rubber mixer in the prior art.

FIG. 16 is a development of the wing unit base portion 128. As shown there, the wings 129, 130 incline with a helix angle $\theta_L$ to the axis of the wing unit base portion 128, and between the upstream end portions in the direction of arrow 121 (in the direction of rotation) of the wings 129, 130 and both end face walls of the wing unit base portion 128, end portion passages 137, 138 of an axial directional length $\delta$ are formed, and at the upstream end portions in the direction of rotation of the wings 129, 130, parting portions 137a, 138a are formed to divide a flow of a mixing material.

Behind the arrow direction 121 (the rotational direction) of the end portion passages 137, 138, cut-off wings 139, 140 extending from the end face walls of the wing unit base portion 128 are provided. The axial directional length of each of the cut-off wings 139, 140 is equal to, or slightly larger than, $\delta$ so that no stagnation of a mixing material is caused within the range of the end portion passages 137, 138. The cross sectional shape and the helix angle $\theta_s$ of these cut-off wings 139, 140 are the same as those of the wings 129, 130. Incidentally, the wings of the wing unit base portion 128' also are constructed in the same way.

If an axial directional length of the cylindrical wing unit base portion 128 (128') is L, a diameter of the mixing chamber 104 is D, a circumferential directional length of the transferring and mixing wings 129, 130 (129', 130') is $L_L$, an axial directional length of the end portion passage 137 (138) is $\delta$, a helix angle of the transferring and mixing wings 129, 130 (129', 130') is $\theta_L$, a helix angle of the cut-off wing 139 (140) is $\theta_s$, and a space between a tip portion of each wing and the inner wall of the mixing chamber 104 is S, then there are the following relations in these measures:

L/D=1.25±0.10

$L_L$/L=0.50 to 0.70

$\delta$/L=0.15 to 0.35

$\theta_L$=$\theta_s$=55°±5°

S/D=0.0275±0.0075

In the internal rubber mixer, the piston 108 is moved upwardly, the hinged supply portion cover 110 is turned to its line position, rubber is supplied into a supply portion, a compounding agent (a vulcanizing agent for example) is supplied into the supply portion from the supply port 111, then the piston 108 is moved downwardly and these mixing materials are forced with pressure into the mixing chamber 104, while the wing units 127, 127' are rotated in the arrow directions 121, 122.

The mixing material is divided into the arrow directions 141, 142 by the parting portion 137a of the wing 129 so as to make a flow movement along the wing side face 131 and a flow movement on the end portion passage 137, as well as being divided into the arrow directions 143, 144 by the parting portion 138a of the wing 130 so as to make a flow movement along the wing side face 132 and a flow movement in the end portion passage 138. This action is likewise made at the wing unit 127'.

That is, the mixing material is divided twice at every one rotation of the wing units 127, 127' and the divided mixing material is moved from the end portion to the central portion and then to the end portion again. As a result, a strong mixing and lapping is carried out, boundary layers are replaced with new ones, and a peak value of the temperature of the inner portion of the mixing material thereby lowered.

The above-mentioned internal rubber mixer is used mainly in a process to knead rubber and a compounding agent. A shearing action of the rubber is lessened so as not to raise the temperature of the rubber to the extent possible, and in order to activate movements of the rubber in the axial direction of the wing unit base portions 128, 128' and 139, 140, the helix angles $\theta_L$, $\theta_s$ are set in a range of 55° to 60°.

The performance required for this kind of internal rubber mixer is an enhancement of ① productivity, ② a macro-dispersibility of the compounding agent (a macro-dispersibility relates to the flowability and agitatability of the entire mixing chamber; dispersibility is at a level where the state of the dispersion of rubber and the compounding agent can be confirmed by the eye or by a magnifying glass of low magnification) and ③ micro-dispersibility of the compounding agent (micro-dispersibility corresponds to a flocculated lump of compound agent being crushed into micro-particles and dispersed uniformly; dispersibility is at a level where it is confirmed by an electron microscope).

In order to enhance productivity and macro-dispersibility of the compounding agent, it is necessary to strengthen the rubber shearing action between the rotor wings (the wing units 127, 127') and the mixing chamber (the mixing chamber 104). In order to enhance the macro-dispersibility of the compounding agent and the cooling ability, it is necessary to improve the agitatability of the rubber within the mixing chamber (the mixing chamber 104).

In an internal rubber mixer in the prior art as shown in FIGS. 13 to 16, (1) if a principal object is to enhance the shearing action of the rubber, and a temperature rise of the rubber is extreme so that there is a fear of burning, and the rubber is once discharged and cooled, and a kneading process is required once again, and (2) if an enhancement of the agitatability of the rubber is emphasized, sufficient micro-dispersibility of the compounding agent may not be obtained. That is, in the internal rubber mixer in the prior art, it is necessary to further strengthen the rubber shearing action between the rotor and the mixing chamber so as to enhance the cooling ability and the micro-dispersibility of the compounding agent.

SUMMARY OF THE INVENTION

In view of the above-mentioned problems in the prior art, the present invention has an object of providing an internal rubber mixer by which ① an enhancement of productivity and an enhancement of micro-dispersibility of a compounding agent can be attained, and ② an enhancement of macro-dispersibility of the compounding agent and a low temperature mixing of rubber can be attained.

According to the present invention, in order to attain the above-mentioned objects, an internal rubber mixer has two four-wing rotors, each rotor having two long wings and two short wings, disposed in parallel with each other within a mixing chamber and are rotated in mutually opposite directions. Rubber thereby is mixed. Both end portions of each long wing of the rotors are cut off (i.e. both end portions of the long wing finish without reaching to the end faces of the rotor). A helix angle of the long wing to the axis of the rotor is made not less than 30° and less than 50°, and each short wing is disposed on the downstream side in the rotating direction of each long wing.

In the internal rubber mixer according to the present invention, a helix angle of each short wing to the axis of the rotor is made the same as that of said the long wing. The axial directional length of each short wing is made smaller than ½ of the axial directional length of the rotor and larger than the axial directional length of each cut-off portion of the long wing.

In the internal rubber mixer according to the present invention, each short wing is disposed on the rotor extending from the end face of the rotor.

In the internal rubber mixer according to the present invention, said two four-wing rotors, each rotor having two long wings and two short wings, are constructed with long wing opposite directional type rotors in which long wings of each rotor are disposed symmetrically between the two rotors.

Figure 1:
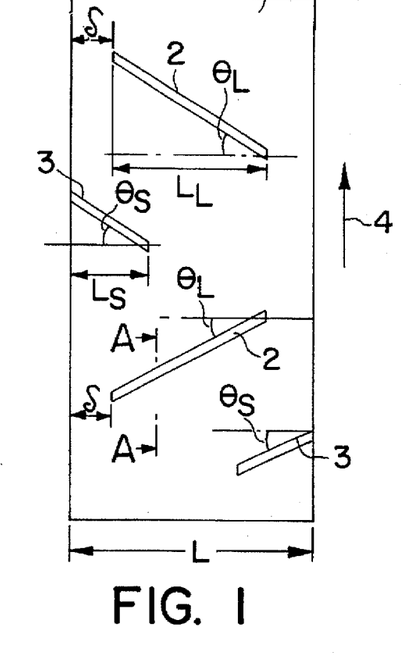
FIG. 1 is a development of a rotor (a long wing opposite directional type rotor) of an internal rubber mixer of a preferred embodiment according to the present invention.
Figure 4:
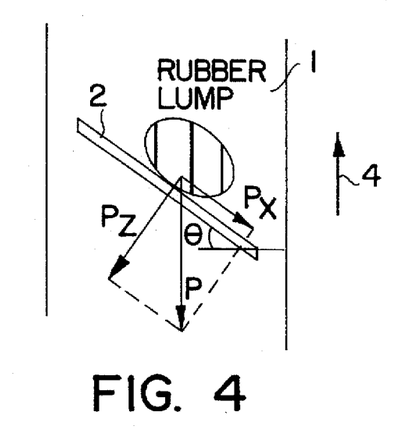
FIG. 4 is an explanatory drawing of shearing action of rubber of a rotor wing taken along line A—A in the direction of the arrows of FIG. 1.
Figure 9:
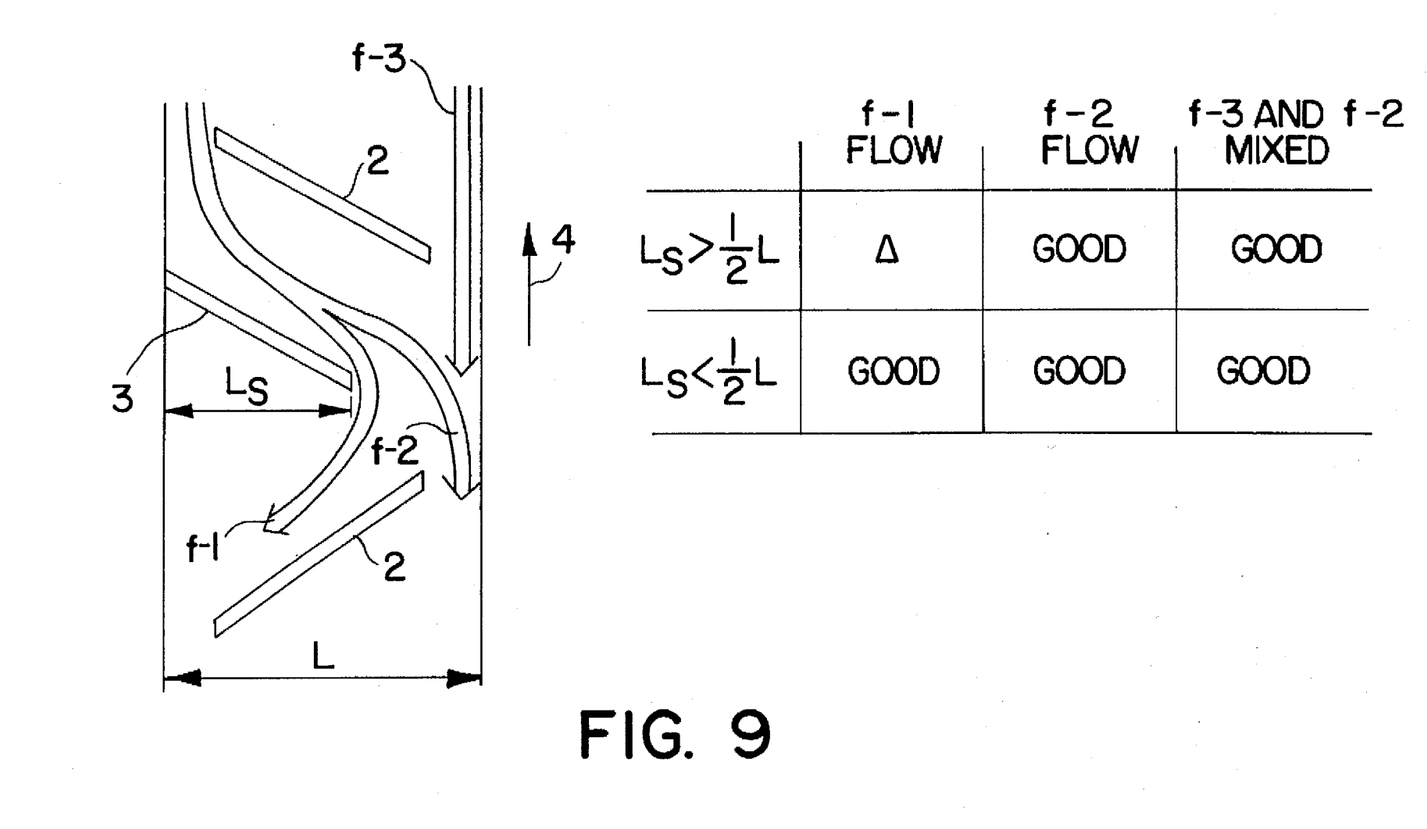
FIG. 9 is the explanatory drawing showing an influence of the length of a short wing ($L_s>$½·L and $L_s<$½·L) given to rubber flows.

As the shearing action of rubber by a rotor wing has a relation to a wing perpendicular component $P_z$ of P in FIG. 4, the larger the value of $P_z$, the larger is the shearing action. And as an agitating action of the rubber has a relation to a wing parallel component $P_x$ of P in FIG. 4, the larger the value of $P_x$, the larger the agitating action. In order to maintain a shearing action and an agitating action to rubber at a high level, it is appropriate to select a helix angle of the long wing 2 in a range of not less than 30° and less than 50° and in an internal rubber mixer according to the present invention, a helix angle of the long wing 2 is set in this range. Further, an axial directional length $L_s$ of the short wing 3 is made larger than an axial directional length δ of the cut-off portion of the long wing 2, and the short wing 3 is disposed on the rotor extendingly from an end face of the rotor, thereby rubber flow f-1 is prevented from passing straight through a rotor space portion (FIG. 1, FIG. 9). In this way, an internal rubber mixer according to the present invention, ① being excellent in the shearing action of the rubber, can enhance productivity as well as the micro-dispersibility of the compounding agent, and, ②, being excellent in the agitating action of the rubber, can the macro-dispersibility of the compounding agent as have well as a low temperature mixing of the rubber.

DESCRIPTION OF THE PREFERRED EMBODIMENTS

Figure 2:
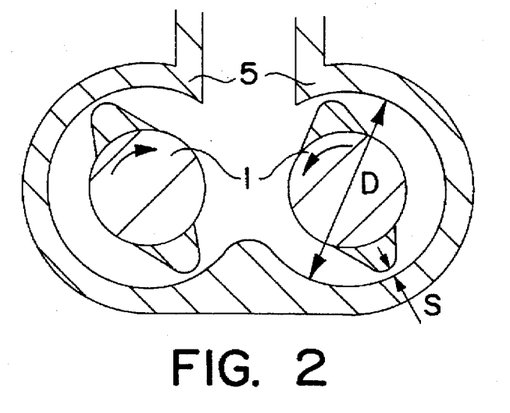
FIG. 2 is a transverse sectional view of the internal rubber mixer of FIG. 1.

One preferred embodiment of an internal rubber mixer according to the present invention is described with reference to FIGS. 1 and 2. Numeral 1 designates one of two four-wing rotors, each rotor 1 having two long wings 2 and two short wings 3 and being disposed in parallel with each other within a mixing chamber 5 so as to be rotated in mutually opposite directions.

Each long wing 2 is cut off at both its end portions so as not to reach the end faces of the rotor, and there are formed passages of an axial directional length $\delta$ at both end portions of each long wing 2. Letter $\theta_L$ designates a helix angle to the axis of rotor of the long wing 2, and is set in a range of not less than 30° and less than 50°. Each said short wing 3 is disposed on the downstream side of the rotating direction (see arrow 4) of each long wing 2 and a helix angle $\theta_s$ to the axis of the rotor of the short wing 3 is set at the same angle as the helix angle $\theta_L$ of the long wing 2.

Letter $L_L$ designates an axial directional length of each long wing 2 and letter $L_s$ designates an axial directional length of each short wing 3. The short wing 3 extends from the end face of the rotor 1 to the inside, and its axial directional length $L_s$ is made smaller than ½ of the axial directional length L of the rotor 1 and larger than the axial directional length of the cut-off portion of the long wing 2.

Figure 3:
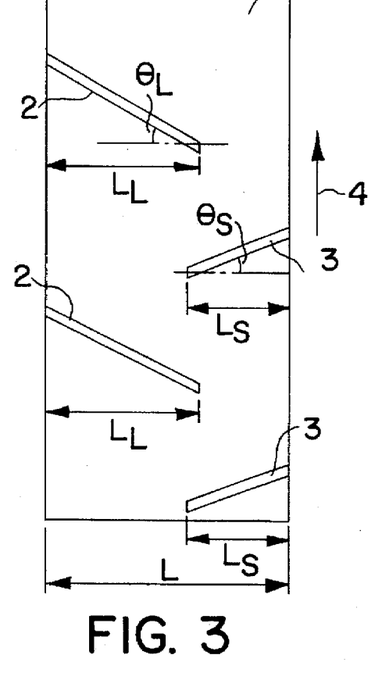
FIG. 3 is a development of a long wing parallel directional type rotor used for comparison tests with the rotor (a long wing opposite directional rotor) according to the present invention.

While a long wing opposite directional type rotor of four wings is described above as a rotor according to the present invention, the rotor of FIG. 3 is a long wing parallel directional type rotor of four wings used for comparison tests with the long wing opposite directional type rotor. If considered in a steady state, the less there is of a stagnation portion 7 of a rubber flow 6 (FIG. 11, FIG. 12), the better is the agitatability of the rotor 1. If the rubber flow 6 is compared (FIG. 11, FIG. 12), there are smaller stagnation portions 7 in the long wing opposite directional type rotor. Thus, the helix angle $\theta_L$ of the long wing 2 is set the same both in the long wing opposite directional type rotor and in the long wing parallel directional type rotor and comparison tests are carried out as to agitatability of both rotors.

In agitatability comparison tests, a CMC (carboxymethylcellulose) aqueous solution is filled at a filling rate of 80% in a mixer made of an acrylic resin of a size of 5 liters internal volume, a color agent is added and a degree of mixing is measured. The reason for using the CMC aqueous solution is that it is visible and that the nature of a quasi-plastic flow, the same as rubber, can be obtained thereby.

Figure 5:
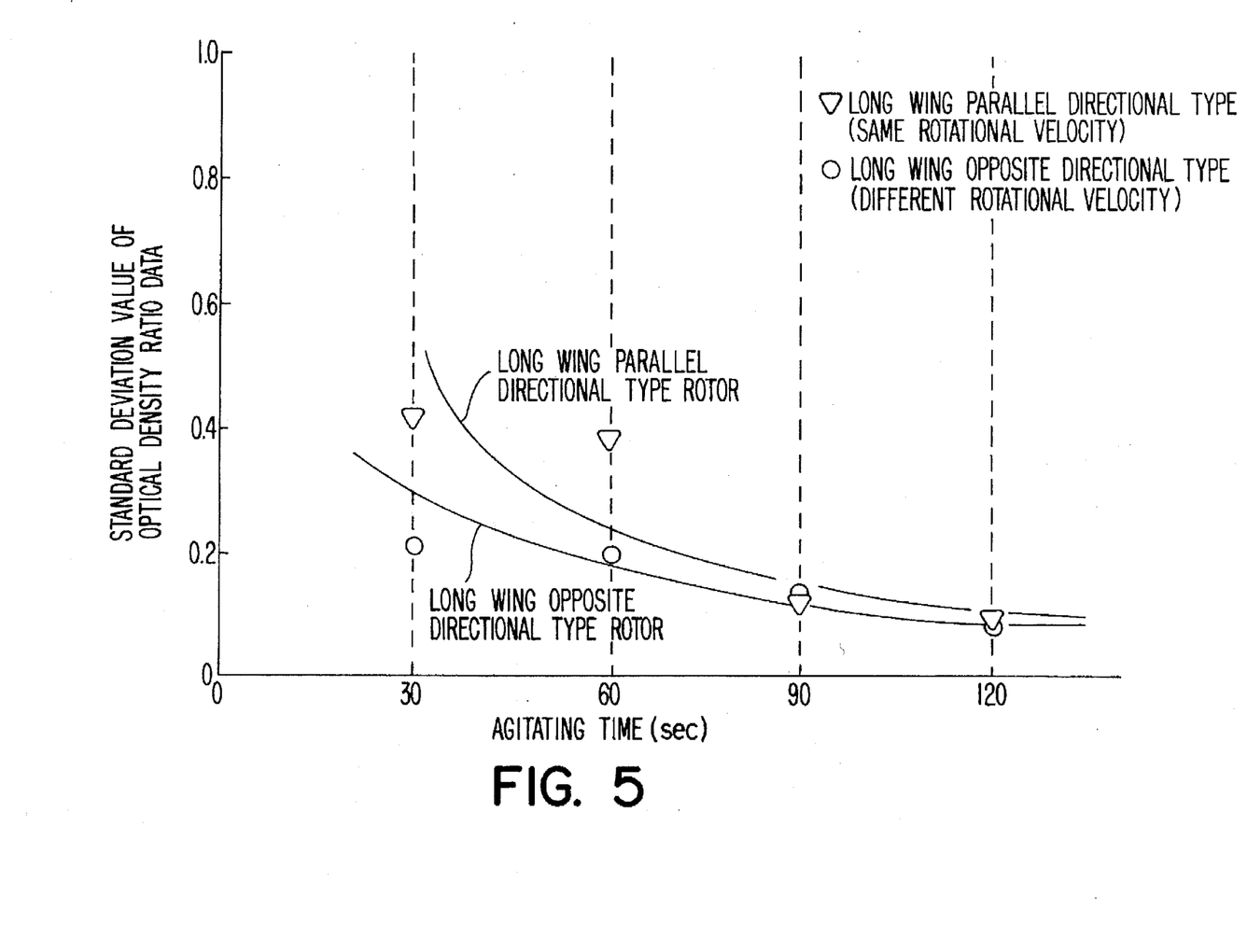
FIG. 5 is an explanatory graph of agitation by a long wing opposite directional type rotor according to the present invention and a long wing parallel directional type rotor used for comparison tests.

FIG. 5 shows a relation between agitating time and a standard deviation value of optical density ratio data at an optimum condition of a long wing parallel directional type rotor and a long wing opposite directional type rotor, respectively. The smaller the standard deviation value of the optical density ratio data is, the better the dispersibility of the color agent. It is found from FIG. 5 that, at an initial mixing state (agitating time 30 sec., 60 sec.), the long wing opposite directional type rotor is twice as good in agitatability as compared with the long wing parallel directional type rotor.

Comparison tests were carried out as to the shearing action on actual rubber and the cooling performance thereof, in which a laboratory mixer of a mixing chamber diameter of 235.5 mm$\phi$ is used and an elementary mixing of natural rubber is performed. A filling rate was 75% and a discharge temperature was kept constant (180° C.). A rubber temperature, electric power consumption and Mooney viscosity after elementary mixing were then measured.

Figure 6:
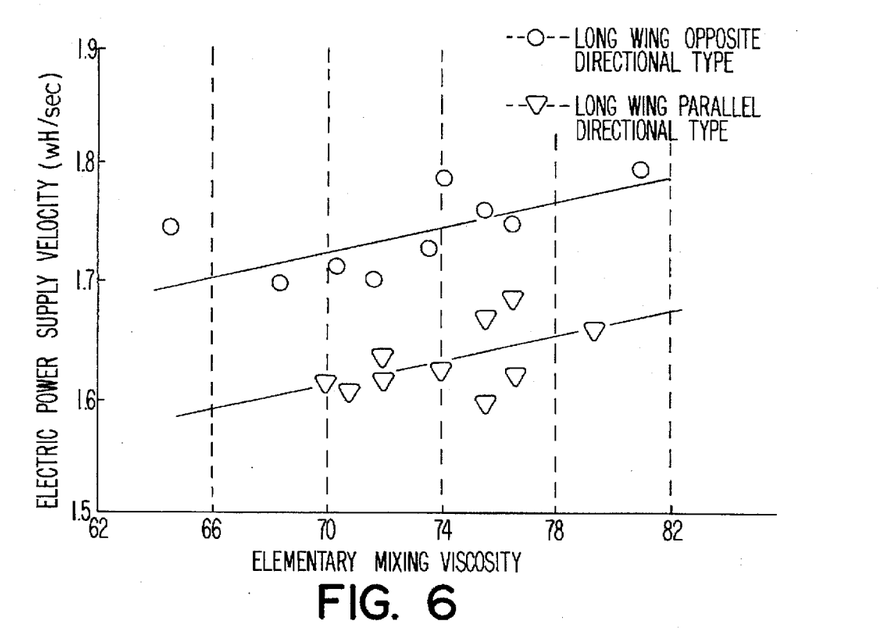
FIG. 6 is an explanatory graph of differences of an electric power supply velocity between a long wing opposite directional type rotor according to the present invention and a long wing parallel directional type rotor used for comparison tests.

FIG. 6 shows a relation between an elementary mixing viscosity of rubber and an electric power supply velocity (electric power consumption/mixing time). If electric power supply velocity is compared between the long wing opposite directional type rotor of FIG. 1 and a long wing parallel directional type rotor of FIG. 3 at a certain elementary mixing viscosity, that of the long wing opposite directional type rotor is faster by 7% than that of the long wing parallel directional type rotor. The higher the electric power supply velocity is, the stronger is the shearing action to rubber. Hence it is found that the long wing opposite directional type rotor has an equal or stronger shearing action as compared with the long wing parallel directional type rotor.

While shearing action is influenced by the length of the long wing 2, in order to make the shearing force larger and yet not provide an obstacle to the flow movement of rubber, it is preferable to set $L_L/L$ at 0.65 to 0.80.

Figure 7:
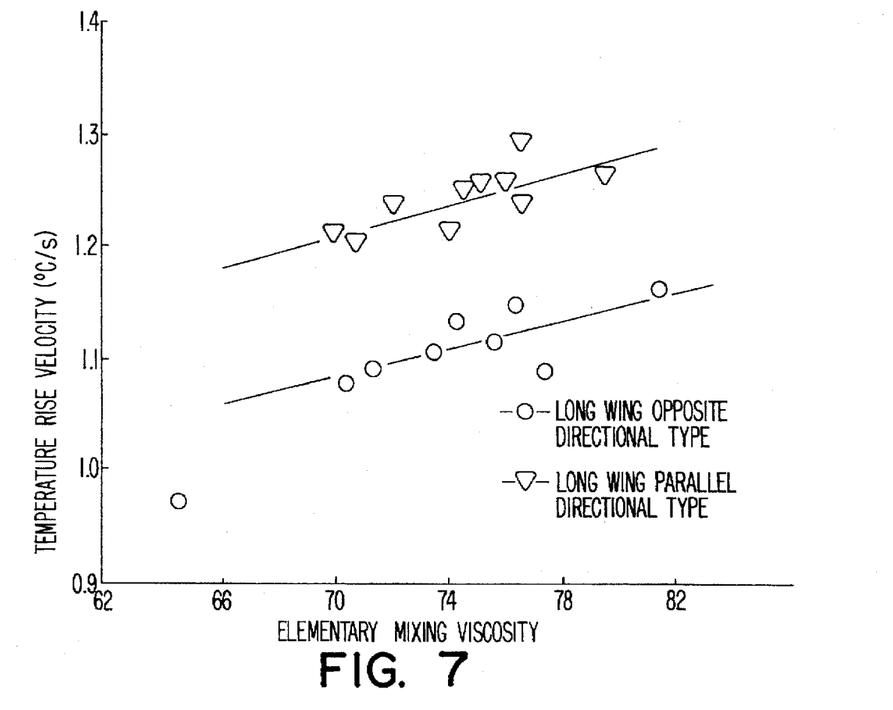
FIG. 7 is an explanatory graph on differences of a temperature rise velocity between a long wing opposite directional type rotor according to the present invention and a long wing parallel directional type rotor used for comparison tests.

FIG. 7 shows the relation between an elementary mixing viscosity and a temperature rise velocity (risen temperature/mixing time). It is found that the temperature rise velocity of the long wing opposite directional type rotor is lower by about 10% than that of the long wing parallel directional type rotor at a certain elementary mixing viscosity.

Figure 8:
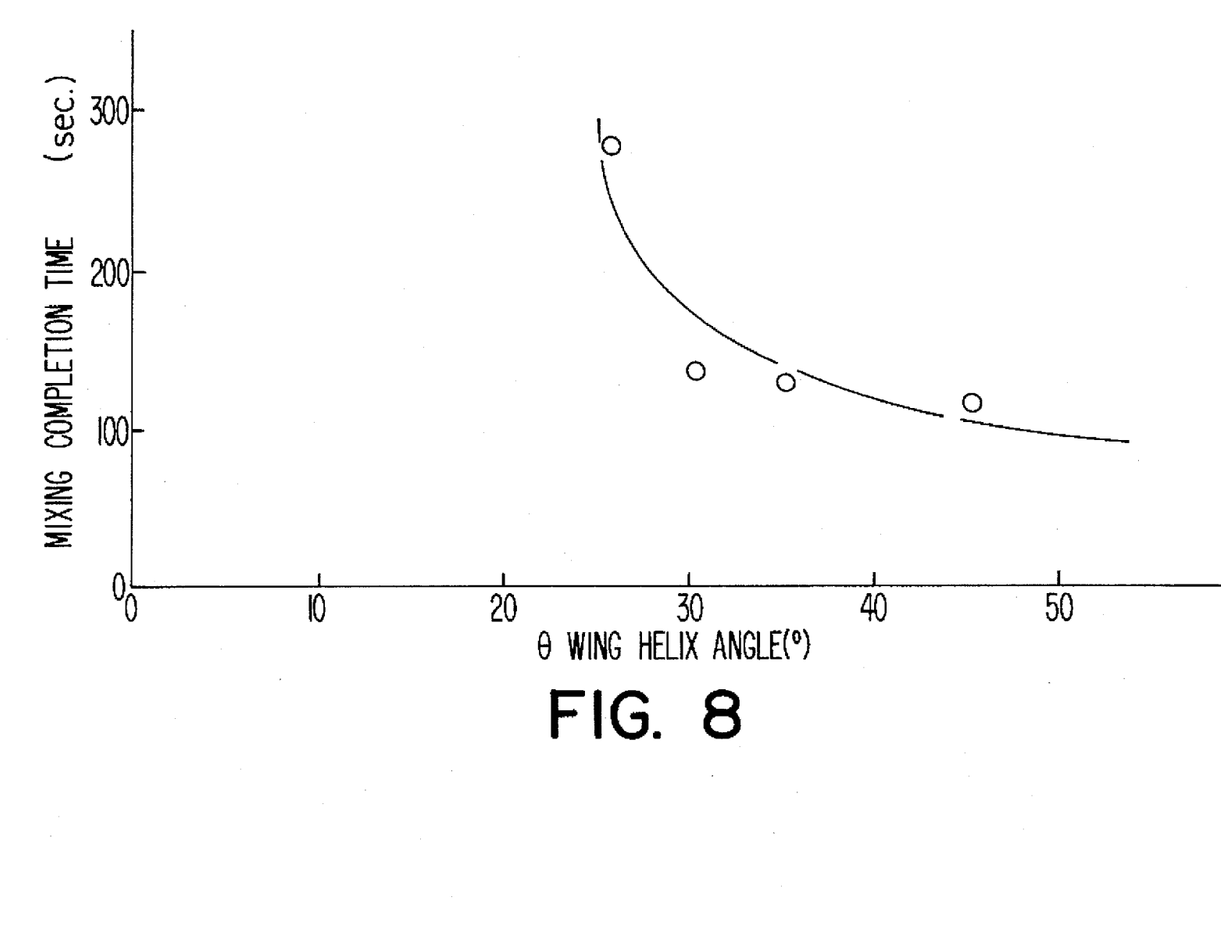
FIG. 8 is an explanatory graph on the relation between a wing helix angle and a mixing completion time.

In the long wing opposite directional type rotor of FIG. 1, a helix angle $\theta_L$ of the long wing 2 and a helix angle $\theta_s$ of the short wing 3 are changed to 25°, 30°, 40° and 45°, a mixing ability of the color agent within the CMC aqueous solution is investigated, and the results shown in FIG. 8 are obtained. FIG. 8 shows a relation between a mixing ability and a mixing completion time according to helix angles. Mixing completion time represents the time when a standard deviation value of an optical density ratio becomes 0.1.

If the influence of wing helix angles $\theta_L$ of the long wing 2 on shearing action to rubber and an agitating action is considered, the shearing action of a rotor wing has a relation to a wing perpendicular component $P_z$ of P of FIG. 4, and the larger the value of $P_z$ is, the larger the shearing action. An agitating action on rubber has a relation to a wing parallel component $P_x$ of P of FIG. 4, and the larger the value of $P_x$ is, the larger is the agitating action.

In order to maintain a shearing action and an agitating action to rubber at a high level, it is appropriate to select a helix angle of the long wing 2 in a range of not less than 30° and less than 50°, which is confirmed by test result shown in FIG. 8.

A helix angle of the short wing 3 is made equal to the helix angle $\theta_L$ of the long wing 2 from the test result shown in FIG. 8.

Figure 10:
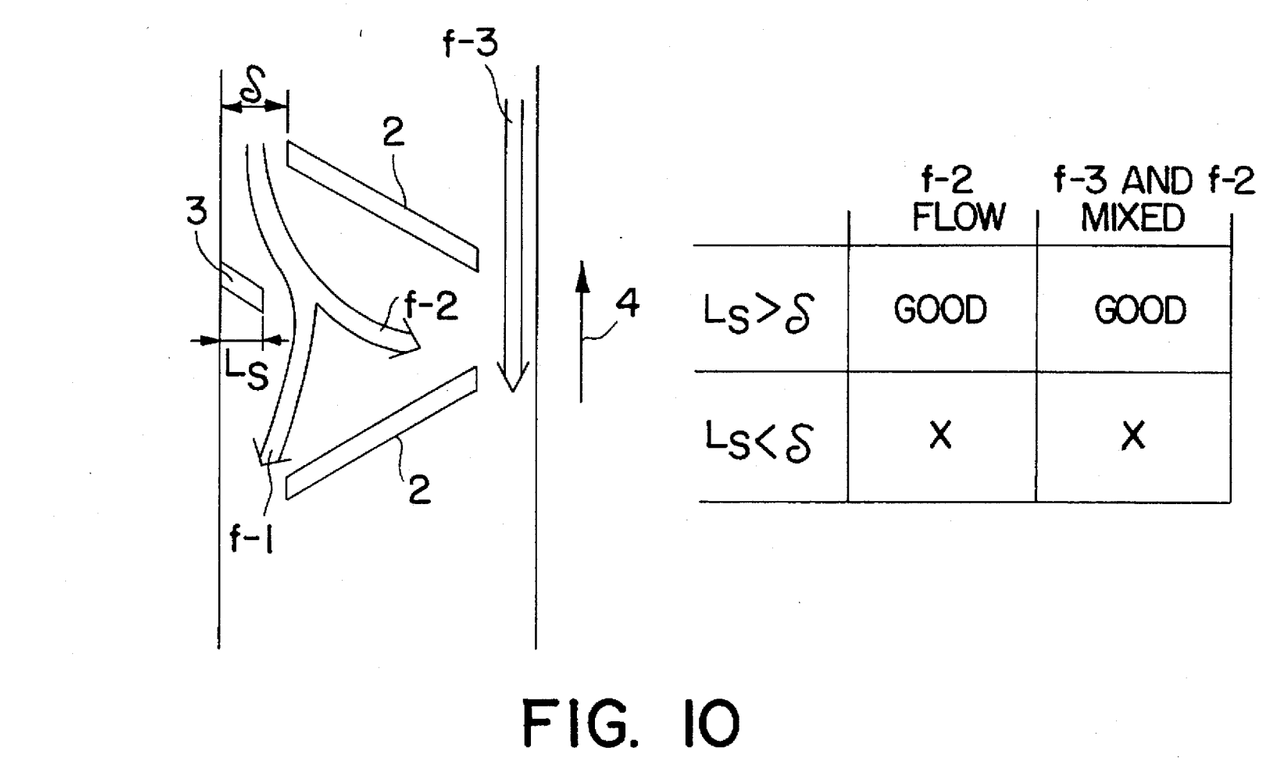
FIG. 10 is the explanatory drawing showing an influence of the length of a short wing ($L_s>$δ and $L_s<$δ) given to rubber flows.
Figure 11:
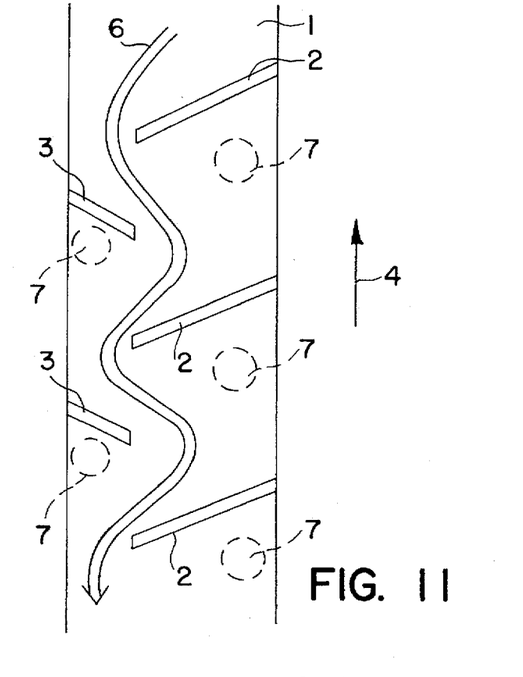
FIG. 11 is an explanatory drawing showing rubber flows of a long wing parallel directional type rotor used for comparison tests.

The axial directional length of the short wing 3 is considered. FIG. 9 is the explanatory drawing showing an influence of the length of the short wing 3 ($L_s>$½·L and $L_s<$½·L) given to rubber flows FIG. 10 is an explanatory drawing showing the influence of a length of the short wing 3 ($L_s>\delta$ and $L_s<\delta$) given to rubber flows, FIG. 11 is an explanatory drawing showing rubber flows of the long wing parallel directional type rotor and FIG. 12 is an explanatory drawing showing rubber flows of the long wing opposite directional type rotor.

As shown in FIG. 9, if the axial directional length $L_s$ of the short wing 3 is made longer than ½ of the length L of the rotor 1, undesirable effects such as a decrease of capacity within the mixing capacity 5, inactivity of a circumferential directional flow of a rubber flow f-1 and increases of exothermic amount accompanying with excessive shearing actions to rubber are caused, which should be avoided in an internal rubber mixer. Hence, in the present invention, the axial directional length $L_s$ of the short wing 3 is made less than ½ of the length L of the rotor 1 ($L_s$<½·L).

Figure 12:
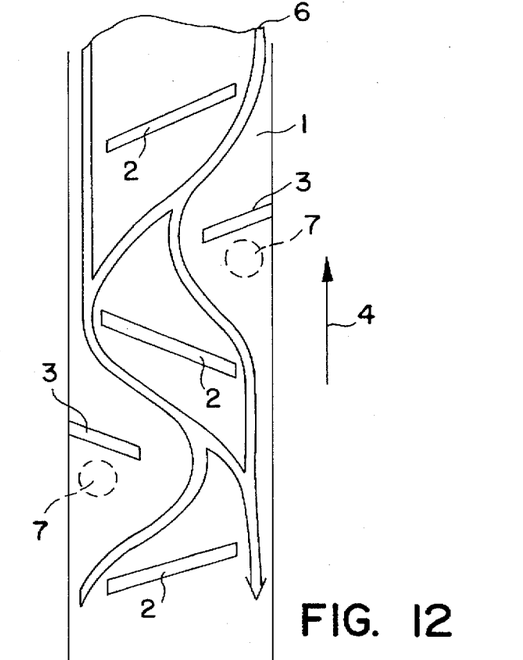
FIG. 12 is an explanatory drawing showing rubber flows of a long wing opposite directional type rotor according to the present invention.

Further, in the present invention, the axial directional length $L_s$ of the short wing 3 is made longer than that $\delta$ of the cut-off portion of the long wing 2, as shown in FIG. 12. This is because, if $L_s$ is smaller than $\delta$ ($L_s$<$\delta$), the rubber flow f-1 cannot be formed at the cutoff portion of the long wing 2 and the rubber flow f-1 passes straight through a rotor space portion. Thus, the axial directional length $L_s$ of the short wing 3 is made larger than $\delta$ ($L_s$>$\delta$)

In a long wing opposite directional type rotor shown in FIG. 1, as compared with a long wing parallel directional type rotor, the electric power supply velocity is increased by 7%, the temperature rise is decreased by 10% and the agitatability (mixing velocity) of the CMC aqueous solution increases twice at an initial stage of agitation (30 sec. to 60 sec.).

The shearing action of the rubber by a rotor wing has a relation to the wing perpendicular component $P_z$ of P in FIG. 4. The larger the value of $P_z$ is, the larger the shearing action. The agitating action of the rubber has a relation to a wing parallel component $P_x$ of P in FIG. 4. The larger the value of $P_x$ is, the larger the agitating action. In order to maintain the shearing action and the agitating action of rubber at a high level, it is appropriate to select a helix angle of the long wing 2 in a range of not less than 30° and less than 50°In an internal rubber mixer according to the present invention, a helix angle of the long wing 2 is set in this range. Further, an axial directional length $L_s$ of the short wing 3 is made larger than the length $\delta$ of the cut-off portion of the long wing 2, and thereby the rubber flow f-1 is prevented from passing straight through a rotor space portion. In this way, an internal rubber mixer according to the present invention, ① being excellent in shearing action of rubber, can enhance productivity and the micro-dispersibility of the compounding agent and, ② being excellent in the agitating action of rubber, can enhance the macro-dispersibility of the compounding agent and attain a low temperature mixing of the rubber.

What is claimed is:

1. An internal rubber mixer, comprising:
    a mixing chamber; and
    two rotors disposed parallel to each other in said mixing chamber and rotatable about respective axes of rotation in mutually opposite directions, wherein each rotor comprises
        two long wings thereon, each of said two long wings having end portions spaced from respective ends of said rotor and a helix angle that is not less than 30 degrees and less than 50 degrees to the respective axis of rotation, and
        two short wings thereon, each short wing being disposed downstream, with respect to the direction of rotation, of one of said two long wings.

2. The internal rubber mixer of claim 1, wherein a helix angle of each of said short wings to the respective axes of rotation is the same angle as the helix angle of each of said long wings, and wherein each of said short wings has a length in the axial direction of said rotor that is less than ½ of the length said rotor and greater than the length of the space from the end portions of said long wings and the respective ends of said rotors.

3. The internal rubber mixer of claim 2, wherein each said rotor has opposite end faces and each said short wing is disposed on said rotor so as to extend from one of said end faces of said rotor toward the other of said end faces of said rotor.

4. The internal rubber mixer of claim 3, wherein each of said rotors are long wing opposite directional rotors in which said long wings of one of said rotors are disposed to be symmetrical with respect to said long wings of the other of said rotors.

5. The internal rubber mixer of claim 2, wherein each of said rotors are long wing opposite directional rotors in which said long wings of one of said rotors are disposed to be symmetrical with respect to said long wings of the other of said rotors.

6. The internal rubber mixer of claim 1, wherein each said rotor has opposite end faces and each said short wing is disposed on a said rotor so as to extend from one of said end faces of said rotor toward the other of said end faces of said rotor.

7. The internal rubber mixer of claim 6, wherein each of said rotors are long wing opposite directional rotors in which said long wings of one of said rotors are disposed to be symmetrical with respect to said long wings of the other of said rotors.

8. The internal rubber mixer of claim 1, wherein each of said rotors are long wing opposite directional rotors in which said long wings of one of said rotors are disposed to be symmetrical with respect to said long wings of the other of said rotors.

9. The internal rubber mixer of claim 1, wherein said helix angle is 49 degrees or less.

10. The internal rubber mixer of claim 9, wherein said helix angle is 45 degrees or less.

* * * * *